US009233320B2

(12) United States Patent
Moen et al.

(10) Patent No.: US 9,233,320 B2
(45) Date of Patent: Jan. 12, 2016

(54) METHOD FOR SEPARATING GAS AND LIQUID AND CYCLONE SEPARATORS THEREFORE

(75) Inventors: Kolbjørn Moen, Oslo (NO); Christian Melby Bjørn, Oslo (NO); Astrid Heggelund, Oslo (NO); Geir Vingelven, Høvik (NO)

(73) Assignee: FJORDS PROCESSING AS, Lysaker (NO)

( * ) Notice: Subject to any disclaimer, the term of this patent is extended or adjusted under 35 U.S.C. 154(b) by 0 days.

(21) Appl. No.: 13/882,771

(22) PCT Filed: Nov. 2, 2011

(86) PCT No.: PCT/EP2011/069240
§ 371 (c)(1),
(2), (4) Date: Jul. 11, 2013

(87) PCT Pub. No.: WO2012/059514
PCT Pub. Date: May 10, 2012

(65) Prior Publication Data
US 2013/0239811 A1 Sep. 19, 2013

Related U.S. Application Data

(60) Provisional application No. 61/410,002, filed on Nov. 4, 2010.

(30) Foreign Application Priority Data

Jun. 30, 2011 (GB) .................................. 1111108.5

(51) Int. Cl.
*B01D 19/00* (2006.01)
*B01D 45/12* (2006.01)
(Continued)

(52) U.S. Cl.
CPC ........ *B01D 19/0057* (2013.01); *B01D 19/0021* (2013.01); *B01D 19/0026* (2013.01); *B01D 45/12* (2013.01); *B04C 3/06* (2013.01); *B04C 5/103* (2013.01); *B04C 5/181* (2013.01)

(58) Field of Classification Search
CPC ...... B01D 45/16; B01D 45/12; B01D 50/002; B01D 46/2411; B04C 5/04
USPC ................ 55/424, 426, 423, 466, 337, 459.1; 95/271; 96/261, 207, 209, 302–306
See application file for complete search history.

(56) References Cited

U.S. PATENT DOCUMENTS 3,822,533 A * 7/1974 Oranje ............................ 55/394
4,350,510 A 9/1982 Hamada et al.
(Continued)

FOREIGN PATENT DOCUMENTS

EP 0 473 566 3/1992
FR 2 471 815 6/1981
(Continued)

OTHER PUBLICATIONS

International Search Report issued Feb. 23, 2012 in International (PCT) Application No. PCT/EP2011/069240.
(Continued)

*Primary Examiner* — Dung H Bui
(74) *Attorney, Agent, or Firm* — Wenderoth, Lind & Ponack, L.L.P.

(57) ABSTRACT

A cyclone separator for separating a fluid into a gas phase and a liquid phase. The cyclone separator includes a vertically oriented vessel with a gas phase outlet at an upper end of the vessel and a liquid phase outlet at a lower end of the vessel; at least one tangentially oriented fluid inlet at the upper end below the gas phase outlet of the vessel; a liquid extractor extracting liquid through the liquid phase outlet at a rate which forms a bulk liquid phase at the lower end of the vessel; and a gas extractor extracting gas through the gas phase outlet. The cyclone separator has at least one flow velocity deflector located at a level in proximity to the bulk liquid-gas interphase which changes the vertical velocity component of a liquid film travelling down the internal wall of the vessel to a horizontally oriented velocity component.

12 Claims, 6 Drawing Sheets

(51) Int. Cl.
  *B04C 5/103* (2006.01)
  *B04C 5/181* (2006.01)
  *B04C 3/06* (2006.01)

(56) References Cited

U.S. PATENT DOCUMENTS

| | | | |
|---|---|---|---|
| 4,375,386 | A | 3/1983 | Windham |
| 5,116,488 | A | 5/1992 | Torregrossa |
| 5,669,948 | A | 9/1997 | Bröttgå rdh et al. |
| 6,340,373 | B1 | 1/2002 | Billington |
| 6,440,197 | B1 * | 8/2002 | Conrad et al. ............... 95/271 |
| 2003/0115843 | A1 * | 6/2003 | Haland ............................ 55/392 |
| 2005/0011170 | A1 * | 1/2005 | Christiansen et al. ......... 55/345 |
| 2006/0049120 | A1 | 3/2006 | Antoun |
| 2009/0178378 | A1 | 7/2009 | Bertram et al. |

FOREIGN PATENT DOCUMENTS

| | | |
|---|---|---|
| GB | 1 562 073 | 3/1980 |
| JP | 2002-373700 | 12/2002 |

OTHER PUBLICATIONS

Great Britain Search Report issued Oct. 26, 2011 in corresponding Great Britain patent application No. 1111108.5.

Written Opinion of the International Searching Authority issued Feb. 23, 2012 in International (PCT) Application No. PCT/EP2011/069240.

* cited by examiner

METHOD FOR SEPARATING GAS AND LIQUID AND CYCLONE SEPARATORS THEREFORE

This application is the National Stage of International Application No. PCT/EP2011/069240, filed Nov. 2, 2011 which claims the benefit under 35 U.S.C. §119(e) of U.S. Provisional Application 61/410,002, filed Nov. 4, 2010.

BACKGROUND OF THE INVENTION

1. Technical Field

This invention relates to a method for separating gas and liquid and cyclone separators therefore.

2. Description of the Related Art

Off-shore extraction of hydrocarbons from a subsea reservoir often involves transportation of a mixture of hydrocarbons, water and dissolved salts in subsea pipelines from the reservoir up to land based or floating top-side facilities for processing the mixture to recover the desired hydrocarbon products. Due to shifting physical conditions during the pipeline transit, there is a problem with formation of hydrates in the fluid mixture of the pipelines threatening to clog the lines.

One much applied solution to the problem of hydrate formation is to add, at subsea level, low water content glycol into the process fluid which usually is a mixture of hydrocarbons, water and dissolved salts and then extract the glycol as so-called rich glycol from the process fluid at the top-side facilities. From an operational costs and environmental point of view, the rich glycol should be regenerated to lean glycol and then reused as hydrate inhibiting agent in the subsea lines. Rich glycol usually contains remains of the hydrocarbons, high water levels, corrosion products (solid particulate corrosion produced remains such as rust flakes etc.) and a mixture of dissolved mineral salts.

From U.S. Pat. No. 6,340,373 it is known a method for the treatment and processing of solutions of an organic fluid, water and one or more compounds of alkaline earth metals, alkali metals and metal ions. The method comprises the following steps: a) conducting a stream consisting of organic fluid, water and one or more compounds of alkaline earth metals, alkali metals and metals ions to a salt reduction and crystallization unit, b) flash evaporating and optionally partially condensing the stream and providing thereby a steam of evaporated water and organic solvent and a steam of organic fluid and the compounds of alkaline earth metals, alkali metals and/or metal ions, c) conducting the steam consisting substantially of organic fluid and the compounds of alkaline earth metals, alkali metals and/or metals ions to a salt reduction means, d) nucleating crystals of the compounds of alkaline earth metals, alkali metals and/or metal ions by means of depressurization and temperature increase, and e) removing the portion of the precipitated crystals and/or particles from the organic fluid. The method is particularly well suited for processing of solution consisting of mono-, di, tri, or polyethyleneglycol or mixtures thereof.

A problem with the processes employing flash evaporation to concentrate and precipitate the salts is that the level of entrained gas bubbles in the liquid in the bottom of the flash evaporator may become unacceptably high, leading to cavitation problems in downstream pumps. The cavity problems may arise when the volume fraction of gas in the liquid extracted from the flash evaporator is from approx. 5 vol % or higher. This problem is especially relevant for liquids of high viscosity, such as is the case for i.e. reclamation of glycol, because entrained gas bubbles are less prone to rise up to the liquid-gas interphase in high viscous liquids and thus escape to the gas phase above the liquid.

Another factor affecting the gas entrainment problem is the gas pressure in the flash evaporator. At lower gas pressures, an entrained gas bubble will become compressed to a higher degree when dragged down into the liquid compared to a similarly sized gas bubble being entrained at a higher gas pressure and dragged down to the same depth in the liquid. For example, in monoethylene glycol, a gas bubble of 1 mm diameter with a gas pressure of $10^3$ Pa just below the liquid-gas interphase will be compressed to a bubble of diameter 0.5 mm at 1 m depth in the liquid. However, if the gas bubble had a pressure of $10^5$ Pa just below the liquid gas interphase, it will only be compressed to 0.9 mm diameter at 1 meter depth. Thus in vacuum flashing, there will be increased problems with small gas bubbles which have significantly smaller buoyancies and thus less capability of being separated from the liquid phase.

One solution of the problem of gas bubble entrainment is disclosed in U.S. Pat. No. 4,375,386 which employs a vacuum evaporator provided with an integral cyclonic-type entrainment separator at the top of the evaporator vapour body which comprises a helical spin plate for imparting a centrifugal action to the vapour and entrained liquid rising from the boiling liquid in the flash chamber. Liquid entrainment is deposited on the vertical wall of the evaporator and flows downward counter-current to vapour flow into a collecting trough, from which it is discharged into a pipe that returns it to the boiling liquid.

U.S. Pat. No. 5,669,948 discloses a cyclone, mainly for separating liquid from gas/vapour which is formed on pressure reduction of spent cooling liquor in connection with pulp production, which includes a casing, an inlet arrangement, a lower outlet line for liquid and an upper outlet line for vapour and gas. The inlet arrangement is connected to a supply line with a valve and the inlet arrangement consists of an exchangeable insertion pipe, the length of which exceeds one meter, preferably two meters and is most preferably between 2.5 and 3.5 meters long. The cyclone is equipped with an "anti-swirl plate" which is arranged on stays directly above the bottom inside the cyclone. The plate is divided up and consists of an external annular part, on top of and in front of which a homogeneous circular part is arranged. Due to the anti-swirl plate, the liquid which accumulates in the bottom of the cyclone cannot be carried away by the swirl which is formed in the central parts of the cyclone.

Another problem associated with cyclone separators is the transfer of the swirling motion into the bulk liquid which may result in a vortex flow into the liquid outlet, thereby resulting in gas leaving the cyclone together with the liquid.

SUMMARY OF THE INVENTION

The main objective of the invention is to provide a method for separating liquid and gas with improved separation efficiency.

A further objective is to provide a cyclone separator capable of performing the method.

Additionally the present invention aims at providing a method and cyclone separator with reduced gas bubble entrainment.

It is also a goal to provide a method and a cyclone separator with limited swirling motion of the bulk liquid to avoid vortex flow of gas into the liquid outlet.

The present invention is based on the realisation that the problem with gas bubble entrainment in separator cyclones is related to the vertical velocity component of the liquid film travelling down the internal wall of the cyclone. The vertical velocity component causes the liquid film to penetrate a distance down into the bulk liquid phase at the bottom of the cyclone separator and thus transport entrained gas bubbles to a disadvantageous depth in the liquid phase.

Thus in a first aspect, the present invention relates to a method for separating a fluid into a gas phase and a liquid phase, where the method comprises:

employing a vertically oriented cyclone separator vessel with a outlet for the gas phase arranged in a upper end of the vessel and an outlet for the liquid phase arranged at a lower end of the vessel, feeding the fluid which is to be separated into the vessel at a tangential flow direction at a height level below the gas phase outlet at a flow velocity forming a liquid film travelling down the internal wall of the cyclone separator in a helical flow pattern, extracting liquid through the liquid phase outlet at a rate which forms a bulk liquid phase at the lower part of the cyclone separator with a relatively constant height level of the bulk liquid-gas interphase, extracting gas through the gas phase outlet, wherein:

at least one flow velocity deflector is employed at a level in proximity of the bulk liquid-gas interphase which changes the vertical velocity component of the liquid film travelling down the internal wall of the cyclone separator to a horizontally oriented velocity component.

In one embodiment of the present invention the at least one flow velocity deflector is arranged below the bulk liquid-gas interphase. In a preferred method the at least one flow velocity deflector is arranged approximately in the range of 1-25 cm, preferably approximately 10 cm, below the bulk liquid-gas interphase.

The method according to the present invention may in one aspect thereof include limiting the swirling motion of the bulk liquid at a level in proximity of the bulk liquid-gas interphase, by employing at least one baffle in the bulk liquid.

In one embodiment of the method according to the present invention the at least one flow velocity deflector is arranged adjacent to the internal wall of the vessel with a smooth transition. Preferable the at least one flow velocity deflector has an optimised curved shape to minimize stirring and whirling of the liquid.

In another embodiment of the method according to the present invention, the method comprises employing two or more flow velocity deflectors, positioned at different levels compared to the bulk liquid-gas interphase and with a radial distance in between.

In a second aspect, the present invention relates to a cyclone separator for separating a fluid into a gas phase and a liquid phase, which comprises:

a vertically oriented vessel with cylindrical symmetry and which has a gas phase outlet at the upper end of the vessel and a liquid phase outlet at the lower end of the vessel, at least one tangentially oriented fluid inlet at the upper end below the gas phase outlet of the vessel, able to form a helical liquid flow down along the internal wall of the vessel, a liquid extractor extracting liquid through the liquid phase outlet at a rate which forms a bulk liquid phase at the lower end of the vessel with a relatively constant height level of the bulk liquid-gas interphase, a gas extractor extracting gas through the gas phase outlet, wherein the cyclone separator comprises:

at least one flow velocity deflector located at a level in proximity of the bulk liquid-gas interphase which changes the vertical velocity component of a liquid film travelling down the internal wall of the vessel to a horizontally oriented velocity component.

In one embodiment of the present invention the at least one flow velocity deflector is arranged below the bulk liquid-gas interphase, preferably the at least one flow velocity deflector is arranged in the range of 1-25 cm, preferably approximately 10 cm, below the bulk liquid-gas interphase In one aspect of the present invention the cyclone separator further includes at least one vortex breaking baffle arranged at a level in proximity of the bulk liquid-gas interphase.

In one embodiment the at least one baffle is arranged below the bulk liquid-gas interphase.

In another embodiment the cyclone separator further comprises a waterspout protection element located above the bulk liquid-gas interphase.

In one aspect of the present the at least one flow velocity deflector is arranged adjacent to the internal wall of the vessel with a smooth transition.

In a further embodiment the at least one flow velocity deflector has an optimised curved shape to minimize stirring and whirling of the liquid.

In yet another embodiment the cyclone separator according to the present invention comprises two or more flow velocity deflectors, positioned at different levels compared to the bulk liquid-gas interphase and with a radial distance in between.

In a preferred embodiment of the present invention the at least one baffle is location at approximately the same height level as the at least one velocity flow deflector.

The height level of the bulk liquid-gas interphase is in the following referred to as the normal liquid level, NLL. The cross-section configuration of the flow velocity deflector may resemble the cross-section of a ski-jump.

BRIEF DESCRIPTION OF THE DRAWINGS

The present invention will be discussed in further detail with reference to the enclosed figures where.

DETAILED DESCRIPTION OF THE INVENTION

The main idea of the present invention is to deflect the downwardly directed movement of the liquid film in the cyclone separator to a horizontally oriented liquid flow at the upper level of the bulk liquid phase in order to prevent the liquid film from carrying entrained gas bubbles deep into the bulk liquid. This feature reduces the residence time of the bubbles in the bulk liquid and thus enhances the separation conditions since by constraining the gas bubbles to the proximity of the liquid-gas interphase they are allowed more time to rise up and have a shorter distance up to the liquid-gas interphase.

Figure 1:
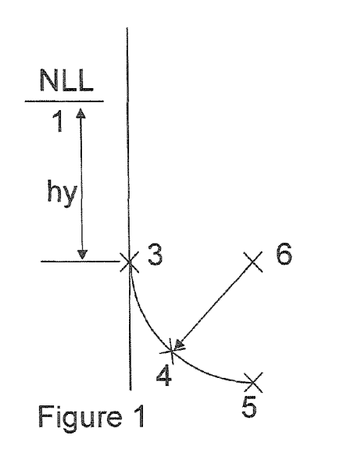
FIG. 1: Illustrates schematically a possible configuration of the flow velocity deflector, with NLL at a height by above the jump/deflector.
Figure 2:
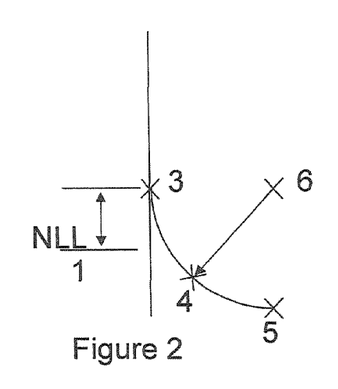
FIG. 2: Illustrates a situation with a low NLL, below the top of the flow velocity deflector.
Figure 3:
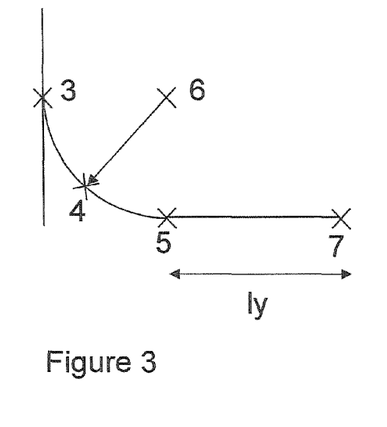
FIG. 3: Illustrates schematically a possible configuration of an extended flow velocity deflector of a length ly.
Figure 4:
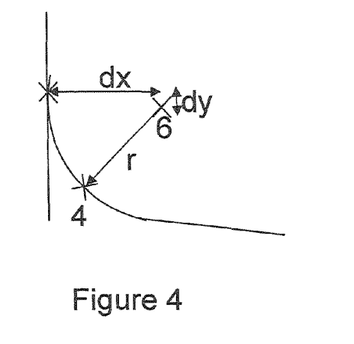
FIG. 4: Illustrates schematically another possible configuration of the flow velocity deflector with variation in the centre position for a selected radius of curvature r.
Figure 5:
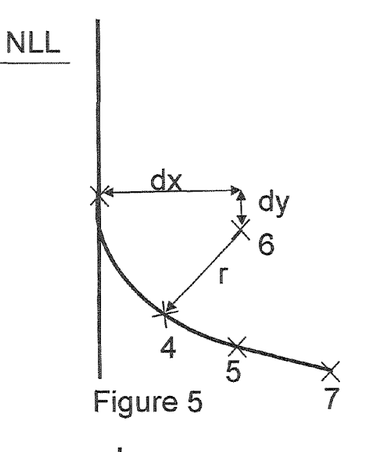
FIG. 5: Illustrates schematically yet another possible configuration of the flow velocity deflector, with variation in center position and radius of curvature r.
Figure 6:
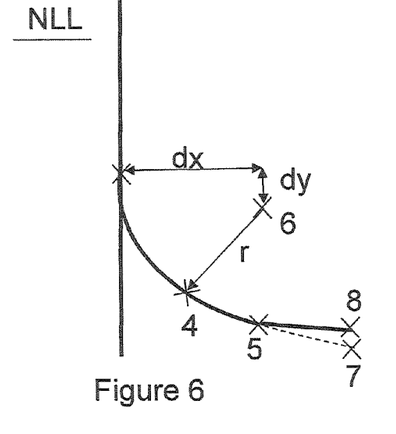
FIG. 6: Illustrates schematically a possible configuration of the flow velocity deflector, comprising an additional angle up or down from tangential.
Figure 7:
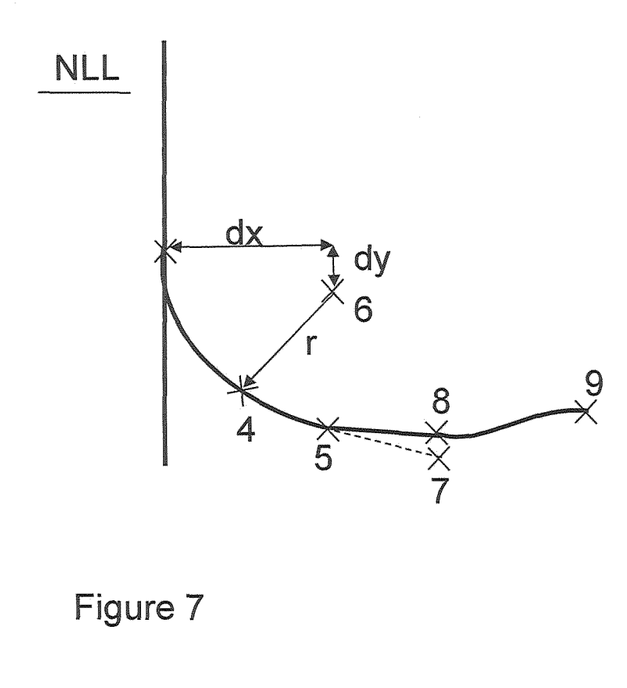
FIG. 7: Illustrates schematically a possible configuration of the flow velocity deflector additional including an up curving and then flattening end.

It may be advantageous to obtain a smooth transition of the liquid film flow direction when it is deflected to a horizontally oriented fluid, since this will reduce stirring and/or whirling of liquid, and hence entraining less bubbles. Another feature that may be advantageous is the design of the deflector; it should preferably be given a shape and dimensioning which optimizes bubble separation. FIGS. 1 to 7 illustrate examples of possible embodiments of the deflector. To arrive at an optimal shape, the efficient radius r (distance between the points 4 and 6), the length (distance between the points 3 and 5) and the extension (between points 5-7), the angle of extension (see FIG. 6 where an additional angle up or down from tangential, from 5-7 to 5-8 is included), position of the center for the radius r of curvature (see FIG. 4) must be optimized. The angle of extension can be up or down from a tangential plane. FIG. 6 illustrates a configuration of the deflector where both the center and the radius is variable, indicated by dx and dy. FIG. 7 illustrates an example embodiment where the end is curved up, flattens out and then is curved down; this to target a desired flow regime optimizing bubble separation. Also illustrated in FIGS. 1-7 is the position 1 of NLL. In FIG. 1 the height by from the top of the deflector up to NLL is illustrated. In FIG. 2 the deflector is arranged with the top point above the NLL.

Figure 8:
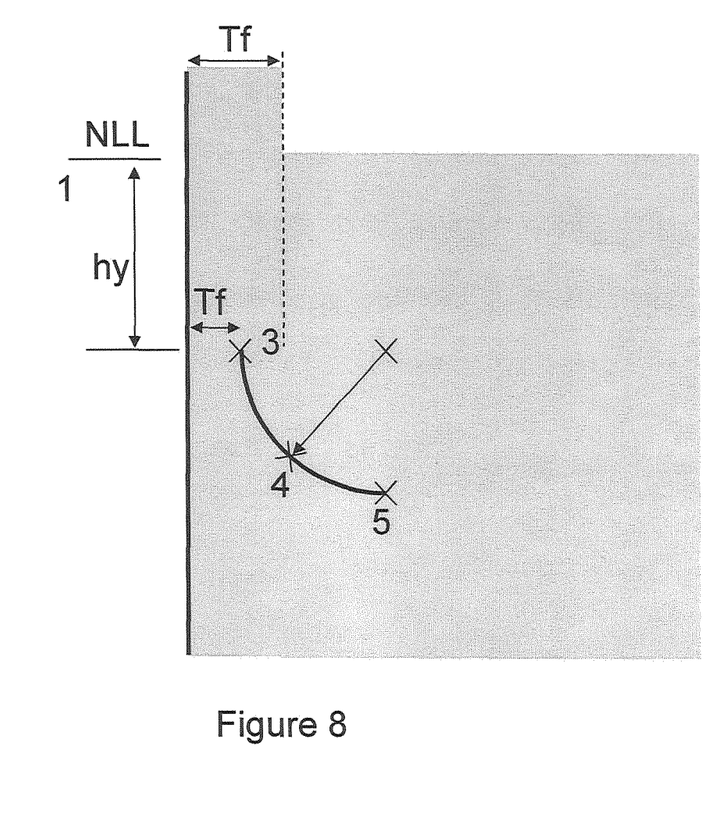
FIG. 8: Illustrates schematically a possible configuration of the flow velocity deflector, where the deflector is arranged at a distance $T_f$ from the inner vessel wall.

Bubbles that initially enter the liquid bulk are mostly the sum of entrained bubbles in the film and bubbles that are mixed in as the film hits the gas-liquid interface. In one embodiment of the invention illustrated in FIG. 8, the deflector is spaced away by a distance Tf from the inner separator wall, thereby splitting the film flow and allowing less horizontal flow of the film which will have most of the bubbles that are mixed in as the film hits the gas-liquid interface. Less flow will create better separation conditions; and hence the overall improvement of separation of entrained bubbles may be achieved.

Figure 9:
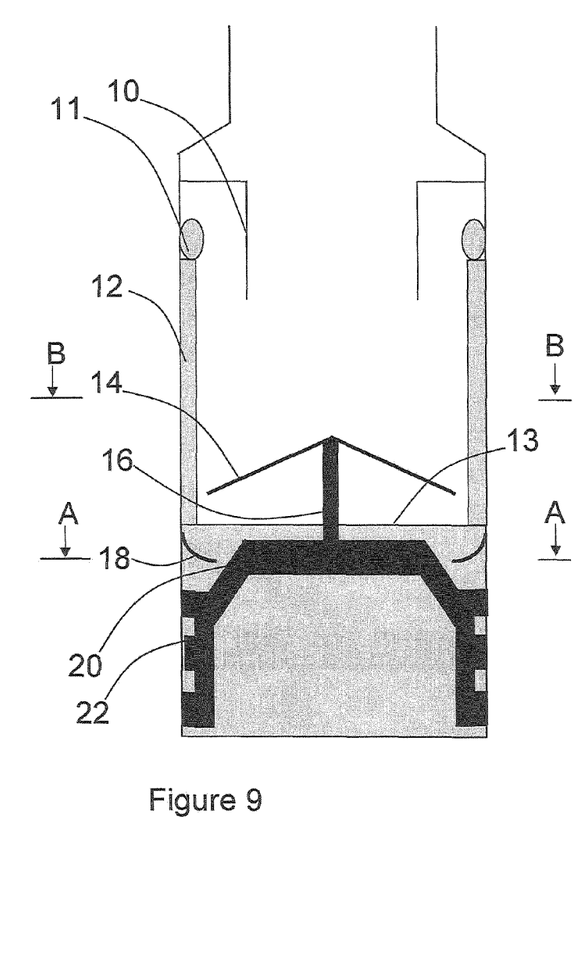
FIG. 9: Illustrates schematically an embodiment of a cyclone separator according to the present invention.
Figure 13:
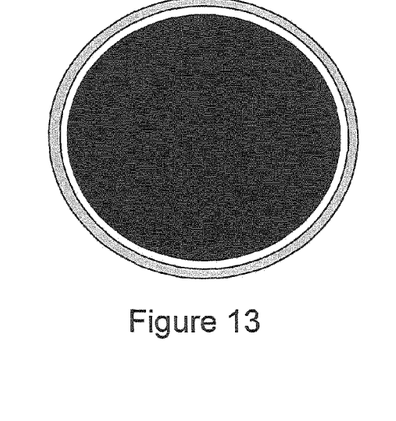
FIG. 13: Illustrates a top view of from line B-B, showing one embodiment of the plate element.
Figure 14:
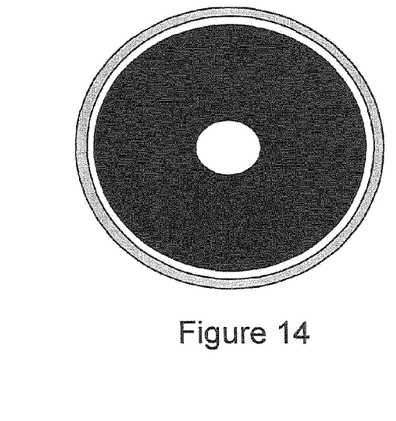
FIG. 14: Illustrates a top view from line B-B, showing a second embodiment of the plate element.
Figure 15:
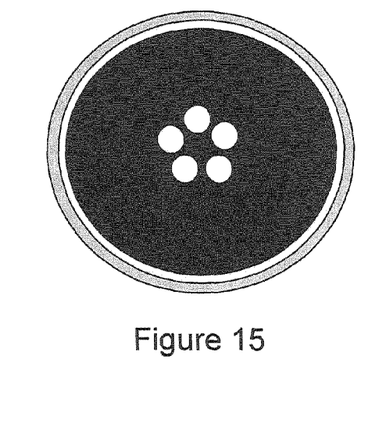
FIG. 15: Illustrates a top view from line B-B, showing a third embodiment of the plate element.
Figure 16:
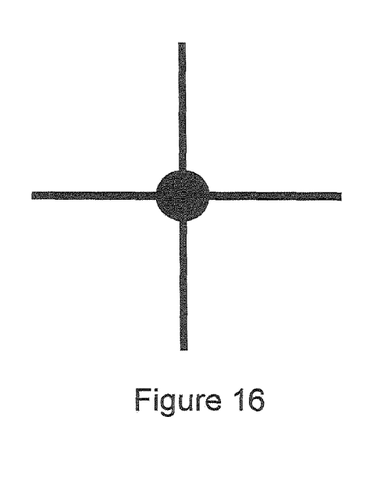
FIG. 16: Illustrates a cross sectional view taken along the line A-A, showing one embodiment of the vortex breaker.
Figure 17:
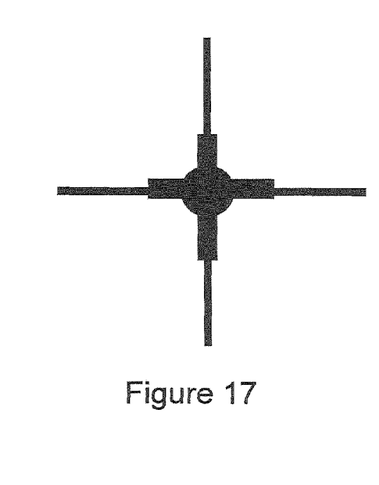
FIG. 17: Illustrates a cross sectional view taken along the line A-A, showing a second embodiment of the vortex breaker.
Figure 18:
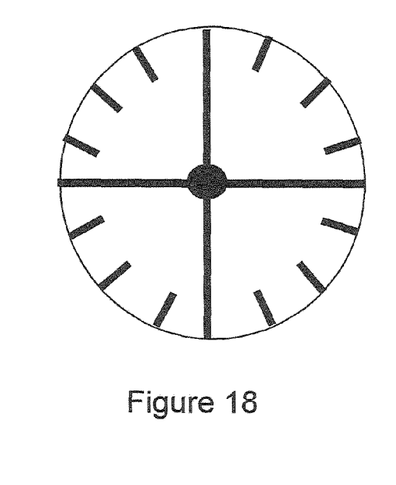
FIG. 18: Illustrates a cross sectional view taken along the line A-A, showing a third embodiment of the vortex breaker.

FIG. 9 illustrates schematically the configuration of a cyclone separator incorporating one embodiment of the present invention. Fluid enters tangentially through the fluid inlet 11. The vortex finder 10 separates the lower liquid section from the upper gas section. The configuration of the gas section is not limiting for the present invention and therefore will not be discussed in further detail. The helical motion of the fluid establishes a liquid film 12 on the inner wall of the cyclone separator. The liquid forms a bulk liquid phase at the lower end of the vessel with a bulk liquid gas interphase 13. A flow velocity deflector 18 is positioned just below the bulk liquid gas interphase. The separator further comprises vortex breaking baffles 20 located below the bulk liquid gas interphase 13. Examples of cross sectional configurations of the baffles along the line A-A are illustrated in FIGS. 16-18. The baffles are in the embodiment illustrated on FIG. 9 connected to the inner vessel wall through fastening means in the form of vertical ribs 22 with apertures. The ribs may in one aspect of the present invention provide additional limitation to the possible swirling motion of the bulk liquid. Further in the illustrated embodiment the separator comprises a waterspout protection element 14 positioned above the bulk liquid gas interphase 13 and connected to the vessel via a central stem. The waterspout protection element 14 may be configured in different ways. FIGS. 13-15 illustrate different embodiments of the element 14 when viewing the element 14 from a position along the line B-B.

Figure 10:
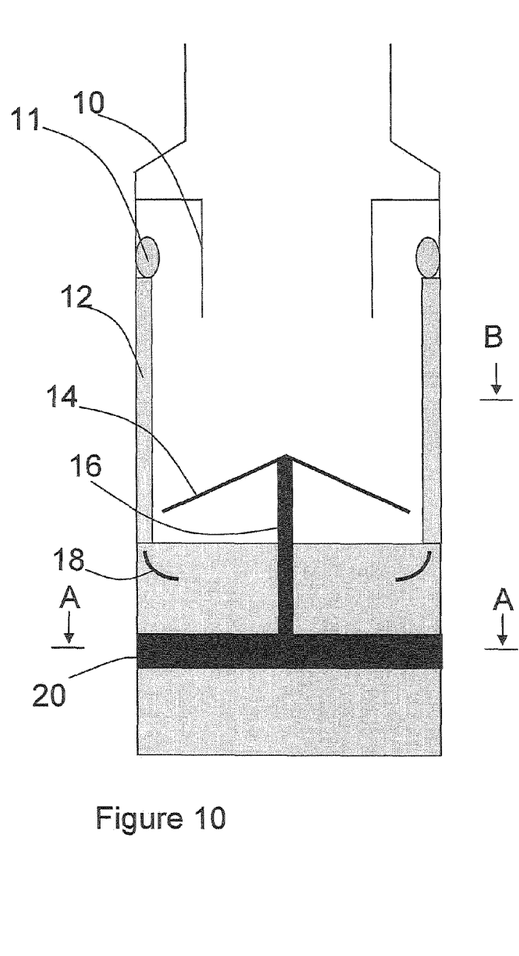
FIG. 10: Illustrates schematically another embodiment of a cyclone separator according to the present invention.

FIG. 10 illustrates another embodiment of the present invention. The same reference numbers are used for similar elements. Here the flow velocity deflectors are positioned at a distance remote from the inner wall of the vessel as previously discussed in connection with FIG. 8.

Figure 11:
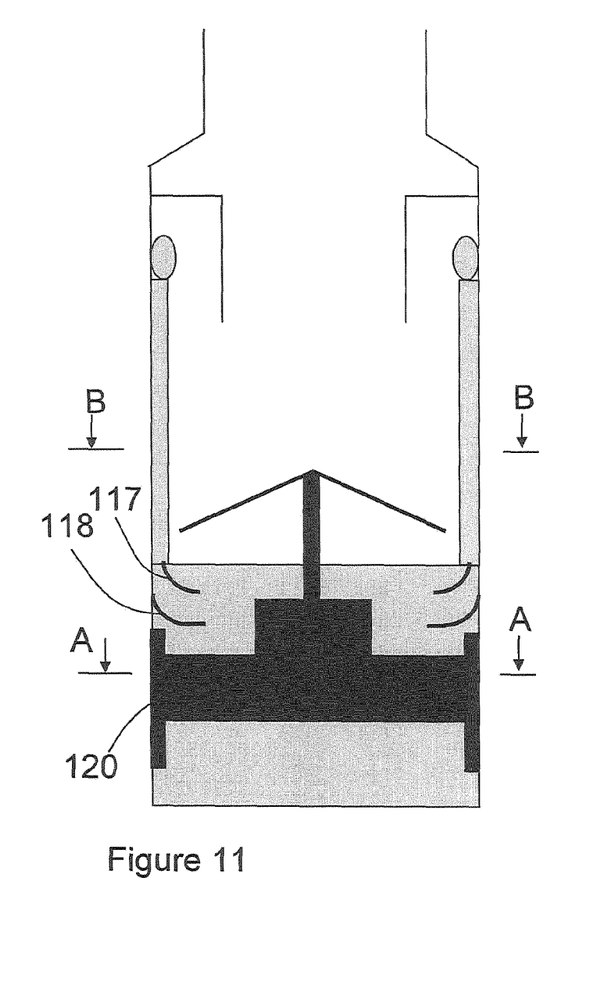
FIG. 11: Illustrates schematically yet another embodiment of a cyclone separator according to the present invention.
Figure 12:
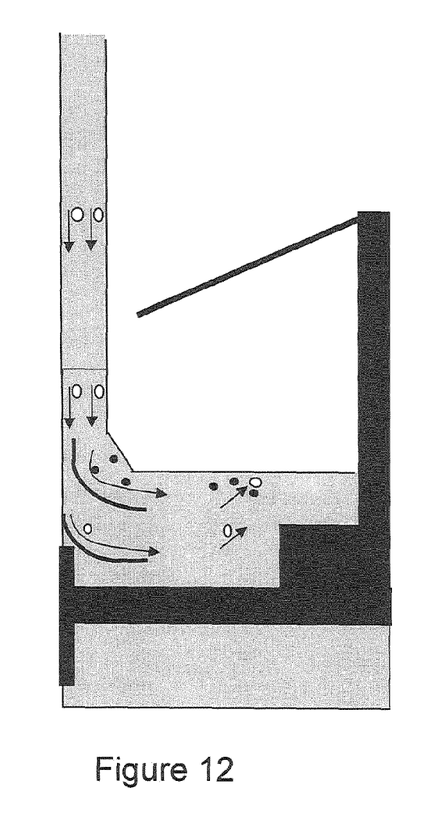
FIG. 12: Illustrates a section of the embodiment illustrated on FIG. 11.

In another embodiment of the invention, as illustrated in FIGS. 11 and 12, two or more deflectors 117, 118 are used, positioned at different elevations and with a radial distance in between. This will split the downward flow of the film that enters into the bulk liquid, and hence the horizontal flow for each deflector is reduced accordingly.

Preferably the lowest deflector 118 is adjacent to the vessel wall, to assure all liquid from the film is deflected to a horizontal orientation. Each of the deflectors can have different shapes (FIGS. 1-7) to optimize the overall separation function.

In FIG. 12, which a section of the embodiment illustrated in FIG. 11, one can see how bubbles are entrained in the liquid film illustrated with white bubbles, and one can see how bubbles are entrained as they hit the liquid bulk illustrated with black bubbles. Further, one can see that some liquid with bubbles from the liquid film is brought to a horizontal flow at the lowest deflector tangential with the vessel wall. And one can see liquid with bubbles from the liquid film as it hits the liquid bulk is brought to a horizontal flow at the upper deflector spaced radially from the bottom deflector. In this figure several vortex breaking means 120 are illustrated, some attached to the vessel shell, some extending over the whole cross section of the tank, and some just in a central part of the cyclone, but all sufficiently below the liquid-gas interface. The shape of the vortex breaking means can be flat, but they can also be curved in all possible dimensions to create optimal vortex breaking means with respect to improvement of bubble separation.

The effect of the invention is not tied to an exact location where the liquid film is deflected to a horizontally oriented fluid flow, but may be obtained by a range of locations from a distance above the liquid-gas interphase to a distance below the liquid-gas interphase. Computational fluid dynamic calculations of the effect of using a deflector in the cyclone separator indicates that with this embodiment, the deflector should preferably be in the range of 1-25 cm, preferably approximately 10 cm, below the bulk liquid-gas interphase. When it is mentioned that the deflector should be at a position it should be interpreted that the top end 3 of the deflector shall be at this position.

However, the optimal location of the liquid flow deflector will depend on fluid mechanical characteristics of both the liquid film and the bulk liquid in the cyclone separator being employed, and may thus vary considerably. It is envisioned that the location of the liquid flow deflector may vary considerably. It may be by as much as one order of magnitude or more above or below the liquid-gas interphase. Hence the invention is not tied to an exact height level where the liquid film is deflected to a horizontally oriented fluid flow, but may be obtained by a range of height levels from a distance above (FIG. 2) the liquid-gas interphase to a distance below (FIG. 1) the liquid-gas interphase.

The invention according to the first and second aspect may advantageously apply a waterspout protection such as a plate element above the liquid-gas interphase in order to reduce entrainment (waterspout effect) of liquid in the swirling gas phase above the liquid, analogous to the "anti-swirl plate" of U.S. Pat. No. 5,669,948. This is advantageous for reducing liquid being carried over into the gas outlet, but it also may have the other effect that it also reduces the amount of bubbles being entrained into the bulk liquid. The waterspout protection may have any known or conceivable design and dimensions as long as it obtains an effect in decreasing entrainment of liquid droplets in the bulk gas phase. Some possible configurations are illustrated in FIGS. 13-15. In the embodiments of FIGS. 14 and 15 one or more openings are arranged near the center of the waterspout protection element to allow for gas trapped below the element to flow up and into the gas section.

The vertical velocity component of the bulk liquid should be as small as possible in order to optimize the transfer of the gas bubbles in the bulk liquid to the bulk gas phase in the cyclone separator. Thus it is envisioned to apply a "vortex-breaker" to reduce the swirling motion of the bulk liquid at the lower end of the cyclone separator vessel in order to avoid formation of a vortex flow extending into the liquid phase outlet. The CFD-calculations also showed that if the plate element is attached by vertically extending members (also functioning as vortex breakers) located a distance from the internal wall of the cyclone; there arises an undesired vertically downward oriented liquid flow along the members. And there arises undesirable whirling or swirling, or the both, of the liquid-gas interphase in the proximity of the vortex breaking elements placed in that elevation, mixing bubbles into the liquid phase. These undesirable effects may be alleviated by having vortex breaking elements sufficiently deep in the bulk liquid, below the bulk liquid-gas interphase.

In one embodiment of the invention, the water spout protection can be supported by a centrally vertically structure, such as a vertically oriented rod along the center axis of the cyclone separator, and apply baffles or plate elements down in the bulk liquid to dampen the swirl flow of the bulk liquid. Alternatively, the spout protection could be supported directly towards the separation shell, but this will negatively affect the flow of the film. Thus the invention accomplishes an integrated support for spout protection, vortex stopper below liquid-gas phase, and avoidance of negative interference of the liquid film.

The first and second aspect of the invention may apply to any known or conceivable design and/or dimensioning of the deflector screen as long as the deflector screen is able to turn the vertically downwardly oriented velocity component of the liquid film to a substantially horizontally oriented velocity component with inducing unacceptable high levels of turbulence at the liquid-gas interphase. In the exemplary embodiments shown in the figures, the deflector screen is made by a quarter pipe forming a "ski-jump" along the internal wall. Also, as indicated above, there is no specific location of the deflector screen which may be considered universally optimal. The location, dimensioning and design of the deflector screen may vary considerably depending on the fluid flow characteristics of both the liquid film and the bulk liquid as well on the dimensions of the cyclone separator being employed.

Thus, the term "relatively constant height level of the liquid-gas interphase" as used herein means that there shall be a bulk liquid phase at the lower end of the cyclone separator vessel with a more or less constant volume of the liquid. That is, there is a desired level of the liquid-gas interphase, but in practice there will be variations both in the volume of the bulk liquid and internal motion of the liquid resulting in temperate variations of the liquid-gas interphase level. Methods for controlling the height level are well known in the art and any method can be employed when utilizing the present invention.

Examples of possible embodiments and configurations of the cyclone separator are shown in FIGS. 1 to 18. These examples should not be interpreted as a limitation of the general idea of converting the vertical flow velocity component of the liquid film into a horizontally oriented liquid flow in the proximity of the liquid-gas interphase at the lower end of the cyclone separator.

The gas outlet can have many embodiments, such as integral with a distillation tower, or as with nozzle outlet on an upper part of the cyclone vessel. The separated gas can be glycol, including mono ethylene glycol, often used for re-concentration of glycol in so called slip-stream process, or a combination of glycol and water for evaporation of glycol and water, which gas components downstream evaporation are separated by distillation.

EXAMPLE

To illustrate the possible increase in efficiency that can be obtained by employing the present invention calculations of the separation efficiency has been performed for three comparative liquid geometric configurations, i), ii) and iii).

Fluid inlet conditions and the geometric configuration of the vessel as such are kept unchanged during the three calculations. Geometry i) includes a flow velocity deflector/ski jump according to the present invention, but does not include additional vortex breakers/baffles. Geometry ii) comprises neither ski jump nor baffles, whereas geometry iii) comprises both a flow velocity deflector/ski jump according to the present invention and vortex breakers/baffles according to a preferred embodiment of the present invention. The calculations are based on a system resembling the system illustrated in FIG. 9. In geometry i) and ii) only the vertical ribs 22 are included whereas the baffles 20 are included in geometry iii), where the baffles are constructed as illustrated in FIG. 16.

Figure 19:
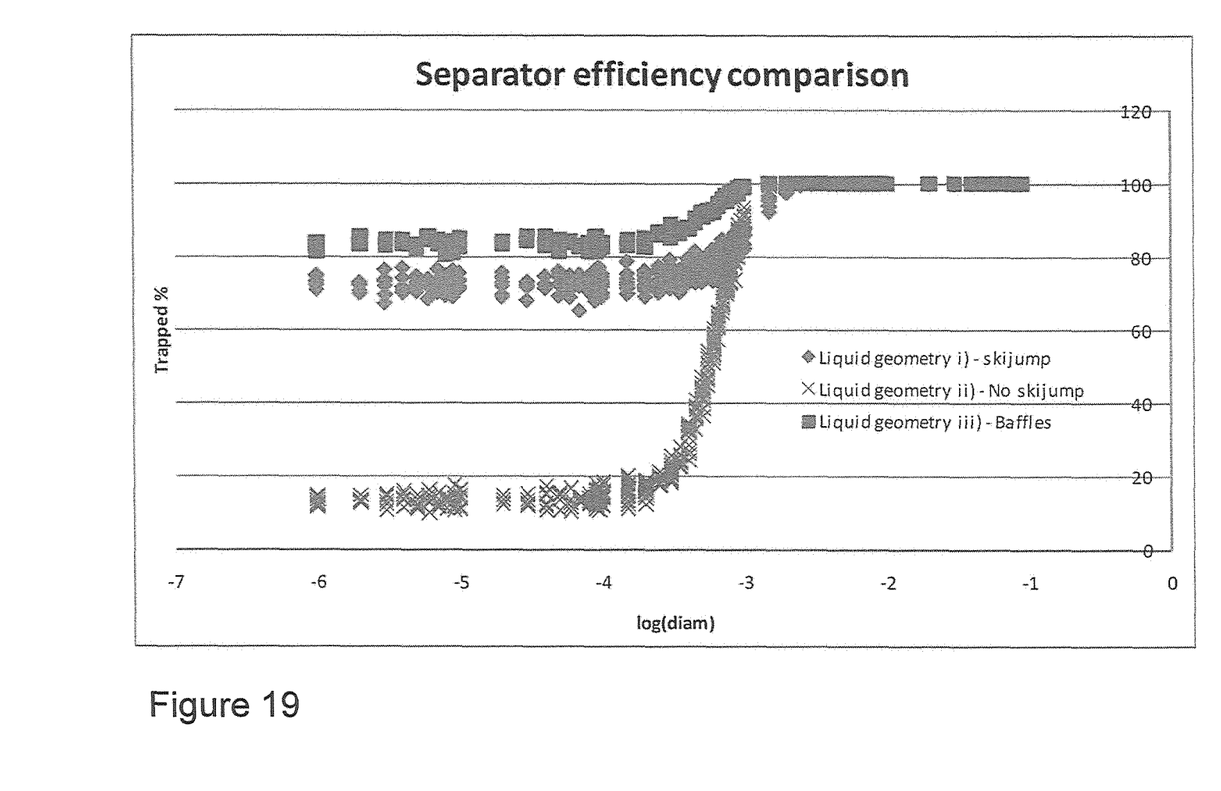
FIG. 19: Shows the effect of the present invention on the separation efficiency.

The results of the calculations are illustrated in FIG. 19. The positive effect of the ski jump in the separation of the smaller bubbles is evident when comparing liquid geometry i) and ii). By including the baffles in geometry iii) an additional separation effect on the smaller gas bubbles is obtained.

The invention claimed is:
1. A method for separating a fluid into a gas phase and a liquid phase, the method comprising:

employing a vertically oriented cyclone separator vessel having a gas-phase outlet arranged in an upper end of the vessel and a liquid phase outlet arranged at a lower end of the vessel;

feeding the fluid, which is to be separated, into the vessel at a tangential flow direction at a height level below the gas phase outlet at a flow velocity sufficient to form a liquid film travelling down an internal wall of the cyclone separator vessel in a helical flow pattern;

extracting liquid through the liquid phase outlet at a rate which forms a bulk liquid phase at a lower part of the cyclone separator vessel with a relatively constant height level of a bulk liquid-gas interphase; and extracting gas through the gas phase outlet, wherein at least one flow velocity deflector arranged adjacent to the internal wall of the cyclone separator vessel is employed at a level in proximity of the bulk liquid-gas interphase which changes a vertical velocity component of the liquid film travelling down the internal wall of the cyclone separator vessel to a horizontally oriented velocity component, wherein the at least one flow velocity deflector is arranged below the bulk liquid-gas interphase.

2. A method according to claim 1, wherein the at least one flow velocity deflector is arranged in a range of 1 to 25 cm below the bulk liquid-gas interphase.

3. A method according to claim 1, wherein the method further includes limiting a swirling motion of a bulk liquid at a level in proximity of the bulk liquid-gas interphase, by employing at least one baffle arranged in the bulk liquid.

4. A method according to claim 1, wherein the at least one flow velocity deflector is arranged adjacent to the internal wall of the cyclone separator vessel with a smooth transition.

5. A method according to claim 1, wherein the at least one flow velocity deflector has an optimized curved shape to minimize stirring and whirling of the liquid.

6. A method according to claim 1, wherein the method comprises employing two or more radially-spaced flow velocity deflectors, positioned at different levels compared to the bulk liquid-gas interphase.

7. A cyclone separator for separating a fluid into a gas phase and a liquid phase, the cyclone separator comprising:

a vertically oriented vessel with cylindrical symmetry and which has a gas phase outlet at an upper end of the vessel and a liquid phase outlet at a lower end of the vessel;

at least one tangentially oriented fluid inlet at the upper end below the gas phase outlet of the vessel, able to form a helical liquid flow down along an internal wall of the vessel;

a liquid extractor for extracting liquid through the liquid phase outlet at a rate which forms a bulk liquid phase at the lower end of the vessel with a relatively constant height level of a bulk liquid-gas interphase;

a gas extractor extracting gas through the gas phase outlet; and at least one flow velocity deflector arranged adjacent to the internal wall of the vessel, the flow velocity deflector being located at a level in proximity of the bulk liquid-gas interphase and configured to change a vertical velocity component of a liquid film travelling down the internal wall of the vessel to a horizontally oriented velocity component, wherein the at least one flow velocity deflector is arranged below the bulk liquid-gas interphase, and wherein the at least one flow velocity deflector is a curved flow velocity screen.

8. A cyclone separator according to claim 7, wherein the at least one flow velocity deflector is arranged in a range of 1 to 25 cm below the bulk liquid-gas interphase.

9. A cyclone separator according to claim 7, wherein the cyclone separator further includes at least one vortex breaking baffle arranged at a level in proximity to the bulk liquid-gas interphase.

10. A cyclone separator according to claim 9, wherein the at least one vortex breaking baffle is arranged below the bulk liquid-gas interphase.

11. A cyclone separator according to claim 7, wherein the cyclone separator further comprises a waterspout protection element located above the bulk liquid-gas interphase.

12. A cyclone separator according to claim 7, wherein the cyclone separator comprises two or more radially-spaced flow velocity deflectors, positioned at different levels compared to the bulk liquid-gas interphase.

* * * * *